United States Patent Office 3,294,622
Patented Dec. 27, 1966

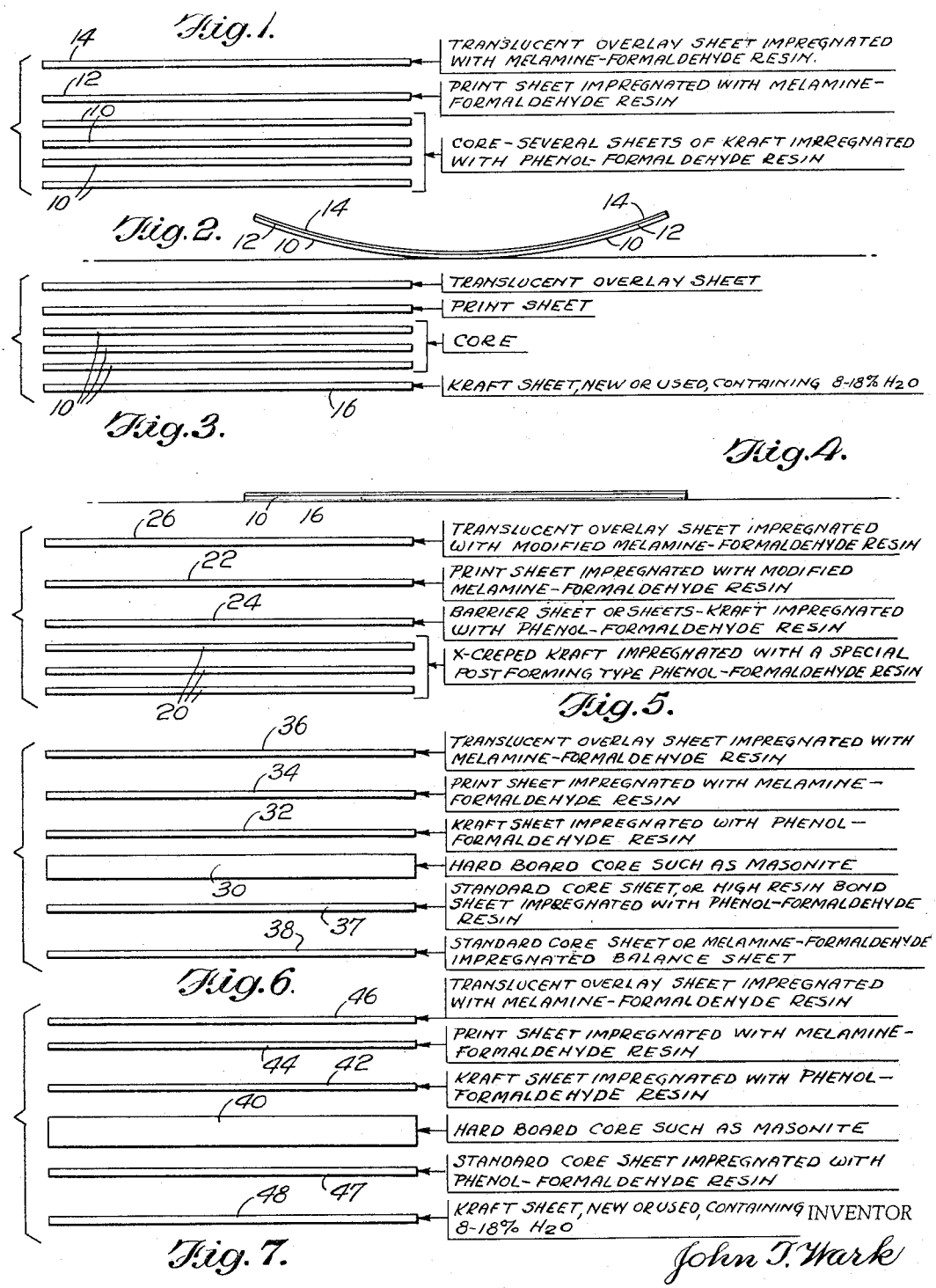

3,294,622
METHOD OF MAKING LAMINATED ARTICLES HAVING REDUCED WARPING TENDENCIES
John T. Wark, Glen Burnie, Md., assignor to National Plastic Products Company, Inc., Odenton, Md., a corporation of Maryland
Filed Apr. 18, 1963, Ser. No. 273,899
8 Claims. (Cl. 161—264)

This application is a continuation-in-part of applicant's co-pending application Ser. No. 721,376, filed March 14, 1958, now abandoned, entitled, "Thermosetting Laminates."

This invention relates to laminates and decorative laminates, and more particularly to planular laminated articles comprising a plurality of superposed cellulosic sheets impregnated with thermosetting resin including a print sheet having a decorative pattern imprinted thereon, said sheets having been consolidated under heat and high pressure to bind them together and substantially completely cure the resin therein, and to methods of making such articles.

Conventional prior art decorative laminates are generally constructed from a core composed of several superposed sheets of kraft paper impregnated with a phenol-formaldehyde resin, a print or pattern sheet composed of alpha cellulose paper impregnated with a melamineformaldehyde resin and superimposed on said core, and a translucent or transparent protective overlay sheet composed of alpha cellulose or rayon paper impregnated with a melamine-formaldehyde resin and covering the print sheet. All of such superposed sheets are consolidated by application thereto of elevated temperatures and high pressures to produce a finished planular laminate, and at the same time the resins therein become substantially completely cured.

One of the principal difficulties encountered in the production of such decorative laminates has been an undesirable tendency for them to become warped. Pronounced warpage is usually noticeable in the laminates as soon as they are produced, and it becomes progressively worse during subsequent prolonged storage. It is important for decorative laminates to be substantially perfectly flat on both sides thereof, since their principal use is for tables, bar and counter tops, door and wall panels, shelves, place mats, etc., where flatness is usually an essential attribute. Unfortunately, the tendency of such laminates to become warped results in transverse curling wherein they become arcuate in cross-section, with the decorative melamine resin impregnated top surface of the laminate becoming concave in contour, and this often causes the edges of the laminate to become detached and project upwardly from underlying supporting surfaces to which they have been secured. Thus, conventional prior art decorative laminates cannot be glued to plaster board for use as wall paneling unless resort is had to a complicated and unsightly joint treatment to prevent the edges of the laminates from tearing away and popping up. Furthermore, such warpage creates problems in fabricating, material handling and sawing, as well as scratched surfaces.

It is believed that the basic cause for the tendency of decorative laminates to become warped resides in their inherently unbalanced structure. That is, the melamine resin impregnated upper layers of such laminates possess different physical properties, especially in shrinkage characteristics during final curing, from that of the phenolic resin impregnated lower layers thereof. This problem may not exist in the case of ordinary non-decorative laminates, particularly where all of the layers thereof are structurally similar to each other. It has been suggested that the tendency of decortaive laminates to become warped could be substantially reduced or eliminated by incorporating therein a lower layer or sheet having special characteristics selected to compensate for the inherently unbalanced structure of the laminates. However, such suggestions have generally involved expensive procedures and materials, and they have not been satisfactory in all cases.

Another important problem encountered in the manufacture of decorative laminates is the difficulty in imparting the property of being post-formable to the laminates. It is well known that certain special modifying agents may be incorporated into standard prior art thermosetting laminating resins, and special curing procedures may be employed, to convert said resins into what is known commercially as post-forming grade laminates. By these techniques, apparently cured laminates are rendered capable of being reshaped at elevated temperatures, and the resins therein then reach their permanently shaped, infusible and insoluble final form or stage. The property of being post-formable is of practical importance in many instances, such, for example, as in the bending of the edges of planular decortaive laminates to form borders or moldings for one-piece kitchen sink tops.

Post-forming grade laminates are not only considerably more expensive than standard grade laminates, but the formability and the moisture resistance of the post-formable laminates is undesirably erratic and unreliable. Consequently, many potential applications for the heretofore available post-forming laminates are presently not realized because of their high cost and unreliable behavior.

An object of the present invention is to produce new and improved decorative laminates, and methods of making such laminates.

Another object of the invention is to substantially eliminate or greatly reduce warpage in planular decorative laminates.

Another important object of the invention is to impart the property of post-formability to laminates made with standard unmodified laminating resins and without employing the special paper and the critical curing procedures ordinarily required for post-forming grade laminates.

Still another object of the invention is to provide new and improved post-formable laminates having a moisture resistance approximately equal to that of standard laminates.

Other objects and the nature and advantages of the invention will be apparent from the following description, taken in conjunction with the accompanying drawings, wherein:

FIG. 1 is a diagrammatic sectional view of a conventional prior art lay-up arrangement for assembling standard planular decorative laminates;

FIG. 2 is a sectional view of a completely assembled standard prior art decorative laminate, showing the usual warpage curvature;

FIG. 3 is a diagrammatic sectional view of a lay-up arrangement for assembling improved decorative laminates embodying the present invention;

FIG. 4 is a sectional view of an assembled decorative laminate embodying the invention made with the lay-up arrangement of FIG. 3;

FIG. 5 is a diagrammatic sectional view of a conventional prior art lay-up arrangement for assembling standard post-forming grade laminates;

FIG. 6 is a view similar to FIG. 5, showing a lay-up arrangement for standard prior art hard board core type laminates, and FIG. 7 is a diagrammatic sectional view of a new lay-up arrangement for hard board core type laminates embodying the present invention.

In the manufacture of standard prior art decorative laminates of the type illustrated in FIGS. 1 and 2, a plurality of core sheets 10 are prepared by impregnating suitable sheets of kraft paper with an incompletely cured phenol-formaldehyde resin, and drying said sheets while advancing the cure of the resin to the B-stage, in a well known manner. Similarly, a print or patern sheet 12 composed of alpha cellulose paper is impregnated with a potentially heat curable melamine-formaldehyde resin, dried and partially cured, and a protective overlay sheet 14 composed of alpha cellulose or rayon paper is likewise impregnated with the potentially heat curable melamine resin, dried and partially cured. In this condition these sheets may be kept in storage until they are needed for making them up into a lay-up arrangement, as illustrated in FIG. 1, in preparation for a laminating operation to produce a completed laminate, as shown in FIG. 2.

Lamination is accomplished by placing several of such assemblies of sheets between polished stainless steel plates, and inserting them between a pair of heated platens of a hydraulic press, where high temperatures and pressures are applied thereto for a predetermined length of time. The temperatures may range from about 265° F. to about 310° F., and the pressures applied may range from about 700 to about 1500 pounds per square inch, during a curing time of about 15 to 30 minutes. The thickness of the resulting laminate is determined primarily by the number and the weight of the core sheets incorporated therein. Laminates are commercially available in various standard sizes ranging from about .022" up to about .250" in thickness. The standard thickness most frequently desired is $\frac{1}{16}$", and such a decorative laminate may contain about seven or eight core sheets, the exact number of sheets depending upon the caliper and the density of the paper as well as the laminating pressure employed. During the laminating operation the melamine resin impregnated alpha cellulose or rayon overlay sheet 14 becomes transparent or highly translucent, and thereafter it functions to provide a hard, abrasion resistant surface for the protection of the print or pattern sheet 12.

Heretofore, in the commercial manufacture of decorative laminates by the above-described method, special precautions have been taken to insure the uniformity of resin concentration in each of the several core sheets in order that the completely cured core be as homogeneous as possible. In addition care has been taken to insure that the moisture content of the B-stage sheets does not increase during storage of the impregnated paper sheets prior to their use. If these precautions were not taken, the finished laminate would have undesirable properties, frequently so severe as to cause the laminate to be unsuitable for sale. For example, excessive moisture pick-up by the impregnated B-stage phenolic core will result in a finished laminate in which the dark colored phenolic resin has bled through the decorative melamine impregnated print sheet and caused unsightly yellowing and staining of the pattern. Variations in resin content from sheet to sheet in the core heretofore have resulted in finished laminates that were extremely erratic in dimensional characteristics; that is, they would exhibit inconsistent warp characteristics after pressing.

In accordance with the present invention it has been found that the substitution of a moisture containing unimpregnated paper sheet 16 for the lowermost sheet of the previously described core sheet 10 when these B-stage sheets are being assembled prior to lamination under heat and pressure produces unexpected results. The unimpregnated sheet at the bottom of the assembly becomes consolidated during the lamination under heat and pressure with the impregnated core sheets to become an integral part of the fully cured laminate. This is due to the flow of the B-stage resin from the impregnated sheets into the unimpregnated sheet when the assembly is subjected to heat and pressure. The presence of moisture in the bottom sheet causes the paper fibers of this sheet to be in a swelled condition and receptive of the flow of resin. Without this added moisture the unimpregnated sheet would not be completely consolidated with the cured laminate core. That is, the finished laminate would show resin free areas on the back and would exhibit extremely poor properties, rendering the laminate unfit for sale. It has been found in addition that the presence of a critical amount of moisture in the bottom sheet, such moisture migrating during the pressing into the impregnated sheets, results in the other additional benefits of the present invention.

One of the most beneficial results of the introduction of the moisture laden unimpregnated sheet is the fact that decorative laminates embodying the invention are perfectly flat when they are first produced, in contrast with the pronounced curvature usually observed in the decorative laminates known heretofore, as depicted in FIG. 2. Furthermore, decorative laminates embodying the invention exhibit only a very slight tendency to become warped after prolonged storage, and if such warpage occurs, it is in a reverse direction from that usually encountered. That is, such laminates may become slightly curved with the melamine resin impregnated top surface thereof becoming convex in contour.

Another outstanding benefit resulting from the presence of the moisture in the back sheet during the laminating operation is that the apparently finished laminates unexpectedly become post-formable. Ordinary decorative laminates possess a very limited degree of post-formability, i.e., the finished laminate cannot be heated and reshaped to small radii without causing severe deterioration and cracking, because the thermosetting laminating resins therein have been fully cured to their permanently shaped, infusible and insoluble final form or stage of cure. It has been common practice to convert standard thermosetting laminating resins into post-formable grade resins by incorporating special modifying agents therein, such as thermoplastic resins, and by employing special curing procedures to prevent overcure prior to the post-forming operation.

As shown in FIG. 5, a standard prior art post-forming grade laminate as made heretofore includes a plurality of core sheets 20 impregnated with a specially modified post-forming grade phenol-formaldehyde resin, a print or pattern sheet 22 of alpha cellulose paper impregnated with a modified melamine-formaldehyde resin, a barrier sheet 24 of kraft paper impregnated with a phenol-formaldehyde resin, and a protective overlay sheet 26, which corresponds to the previously described overlay sheet 14 of standard laminates. The barrier sheet 24 is provided to prevent any residual volatile ingredients in the phenolic resin impregnated core from bleeding upwardly and injuring the inked pattern printed on the print sheet 22, since such volatiles may sometimes be present in the case of the post-forming grade resins. The core sheets 20 are customarily composed of specially creped kraft paper, which is more flexible than the ordinary kraft paper employed in standard laminates, and this flexibility is desirable to facilitate bending of the laminate in the post-forming operation.

Standard prior art post-formable laminates as heretofore made require a rather narrow temperature range of between about 300° F. and 325° F. in the post-forming operation. In contrast, laminates embodying the present invention tolerate a much wider range of post-forming temperatures without cracking or blistering.

Without postulating any detailed theories as to the exact manner in which the deliberately incorporated water in the back sheet affects the laminating resins to produce the above-described beneficial results it appears that this water imparts improved flow properties to the resins, and it also broadens the curing cycle required for post-forming. Due to the improved flow properties of the resins in laminates embodying the invention, it is possible to reduce substantially the resin content ordinarily employed in the core sheets without impairing the quality of the resultant laminate. It has been found that the moisture resistance and any tendency to delaminate following the standard two hour boiling water moisture absorption test are not adversely affected by the lower resin content. In comparison with a normal resin content of about 31% to 35% based on the total weight of the impregnated paper in standard laminates, the resin content may be reduced to about 20% to 25% when a wet back sheet is used as in laminates embodying the present invention. Of course, this reduction effects a substantial economy in resin consumption.

Another economy made possible by the new laminates is the use of low quality, poorly penetrating kraft paper in the make up, without detracting from the quality of the finished laminate. Paper heretofore considered waste, which has been used as cushion material in the pressing operation to protect the polished stainless steel planishing plates from injury, and which becomes highly compressed during such operation, has been found to be acceptable for constructing laminates when it is moistened in accordance with the present invention.

The percentage of moisture which should be added to produce the above-enumerated beneficial results is preferably at least about 8% and not more than about 18%, based on the weight of the dry unimpregnated paper in the back sheet. The weight of the dry paper refers to the weight of the paper as purchased prior to the addition of the water thereto. This range of moisture content was determined empirically. Employment of less than 8% moisture produced a very spotty, non-uniform flow of resin into the back sheet, and resulted in very poor moisture resistance in finished laminates. Moisture content above 18% created a tendency for warpage to occur after a short storage time, and resulted in severe convex warpage after prolonged storage. Moreover, such high moisture contents caused bleeding of the phenolic resins from the core sheets to the melamine resin impregnated print sheet, thereby destroying the inked pattern thereon, and, in some cases the migration of the phenolic bodies apparently produced explosive craters at the surface of the laminates.

Incidental to the above-mentioned advantages, it has been found that laminates embodying the invention exhibit increased natural surface gloss over that of other laminates, which is highly desirable. It has also been observed that the new laminates are easier to saw, rout and plane during fabrication, with very little chipping or cracking, and with less tool wear. These results may be attributed to the improved flow properties of the resins therein. It should be also noted that laminates embodying the invention possess superior moisture resistance ranging from about 1% to 6%, which is approximately equal to that of standard decorative laminates, and is about half of the moisture absorption presently considered allowable for standard post-forming grade laminates.

In a practical test of the effectiveness of the invention, a comparison of moisture absorption was made between a standard prior art laminate and a laminate embodying the invention. For the standard laminate, a kraft paper of 95 lb. ream weight was impregnated with 33% by weight of phenol formaldehyde resin and then dried to a 5.5% volatile content. Seven of such impregnated sheets were assembled with a print sheet and an overlay sheet, both of which were impregnated with a melamine laminating resin, and the assembly was pressed for 30 minutes at 300° F. and 1000 p.s.i. pressure. The resultant laminate was cut into 1" x 3" specimens, which were weighed, then boiled in water for two hours, and reweighed. The moisture absorption determined in this manner ranged from about 3% to about 5% for these specimens.

For a laminate embodying the invention, a kraft paper of 95 lb. ream weight was impregnated with 29.5% by weight of phenol formaldehyde resin and then dried and partially cured to a 7.5% volatile content. Six of such impregnated sheets were assembled with a melamine resin impregnated print sheet and overlay sheet, and a used kraft sheet unimpregnated by resin but containing about 12% by weight of added moisture was placed on the back of the assembled sheets. This assembly was pressed for 30 minutes at 300° F. and 1000 p.s.i. pressure. The finished laminate was cut to form 1" x 3" specimens, which were then weighed, boiled in water for two hours, and reweighed. It was determined in this manner that the moisture absorption of these specimens ranged from about 2% to about 4%. Thus, by comparison tests the laminate embodying the invention showed an average of 1% reduction in moisture absorption even though the average resin solids of the consolidated core was almost 25% lower than that in the standard laminate due to the reduction of the average resin solids per sheet by addition of the unimpregnated back sheet.

In other comparison tests, an empirical determination of the flowability of the resins was made by employing a black colored resin as the impregnant in each case. The back of a standard laminate made in this manner showed only small, spotty blackened areas, indicating slight resin flow, and the laminate was not considered satisfactory for selling purposes. However, the back of a laminate embodying the invention made with such black resins, showed a uniformly dark black color, indicating that the resin had flowed into and saturated the back kraft sheet containing the 12% added moisture.

The invention may be embodied successfully in other types of laminates, such as a conventional prior art hardboard core type decorative laminate. FIG. 6 shows a lay-up arrangement for standard prior art hardbard core laminates, including a hardboard core 30, such as a sheet of Masonite, which is covered by a kraft paper sheet 32 impregnated with a phenol-formaldehyde resin, then a print or pattern sheet 34 of alpha cellulose paper impregnated with a melamine-formaldehyde resin, and a translucent overlay sheet 36 of alpha cellulose or rayon paper impregnated with a melamine-formaldehyde resin. Beneath the hardboard core 30 lies a pair of core sheets 37 and 38, which may both be standard core sheets of phenolic resin impregnated kraft paper, but generally the sheet 37 is a high resin content phenolic-resin impregnated bond sheet, and the sheet 38 is melamine resin impregnated alpha cellulose sheet, thereby providing the laminate with a more balanced structure. Such laminates show very erratic behavior, especially in the standard moisture absorption test, where the absorption may range from about 10% to about 40%.

FIG. 7 shows a hardboard core decorative laminate embodying the present invention, comprising a hardboard core 40 of Masonite, covered by a plurality of sheets 42, 44, and 46 corresponding to the previously described sheets 32, 34, and 36 of standard laminates of this type. However, beneath the core 40 there is provided a standard core sheet 47 of kraft paper impregnated with a phenolic resin, and a wet back sheet 48 composed of new or used kraft paper containing about 8% to about 18% of water. This new structure results in a more flat and stable laminate, and the moisture absorption thereof is only about 5% to about 15%. Furthermore, the new hardboard core laminates can be post-formed to a limited extent, whereas standard laminates of this type are entirely lacking in this property.

Although only certain specific laminating resins and papers have been mentioned in detail, it should be understood that the invention encompasses the utilization of equivalent resins, papers, and other laminating materials.

It will be obvious to those skilled in the art that various changes may be made without departing from the spirit of the invention, and therefore the invention is not limited to what is shown in the drawings and de-

What is claimed is:

1. A method of making substantially flat, post-formable, planular laminated articles comprising the steps of consolidating under pressure a plurality of superposed sheets between a pair of heated platens to substantially completely cure the resins therein and to produce a post-formable, planular decorative laminate, the superposed sheets comprising a top protective overlay sheet composed of a cellulosic material and a pattern sheet thereunder composed of a cellulosic material having a design printed thereon, said overlay sheet and pattern sheet being impregnated with a melamine formaldehyde laminating resin which has been partially cured therein, a plurality of core sheets thereunder of cellulosic material impregnated with a partially cured phenol-formaldehyde laminating resin and a relatively wet bottom paper sheet unimpregnated by laminating resins and containing about 8% to about 18% of added water based on the weight of the sheet, said bottom sheet becoming integral with the bottom of the core during said consolidation due to the flow of resin from the core to the bottom sheet, which flow is accelerated by the presence of said added water in the bottom sheet.

2. The method defined by claim 1 wherein the resulting decorative laminate is heated and reshaped by post-forming.

3. The method defined by claim 1 wherein said bottom sheet is kraft paper.

4. The method defined by claim 2 wherein said bottom sheet is kraft paper.

5. The method defined by claim 3 wherein said core sheets are kraft paper.

6. The method defined by claim 4 wherein said core sheets are kraft paper.

7. The product resulting from the process of claim 1.

8. The product resulting from the process of claim 2.

References Cited by the Examiner
UNITED STATES PATENTS

| | | | |
|---|---|---|---|
| 2,028,076 | 1/1936 | Norris | 156—228 |
| 2,453,679 | 11/1948 | Stamm et al. | 156—262 |
| 2,497,712 | 2/1950 | Quchter | 156—278 |
| 2,720,478 | 10/1955 | Hogg | 156—278 |
| 2,801,198 | 7/1957 | Morris et al. | 161—263 |
| 2,830,924 | 4/1958 | Witt | 156—278 |

ALEXANDER WYMAN, *Primary Examiner.*

R. J. ROCHE, *Assistant Examiner.*